United States Patent
Danilov et al.

(10) Patent No.: US 10,579,297 B2
(45) Date of Patent: Mar. 3, 2020

(54) SCALING-IN FOR GEOGRAPHICALLY DIVERSE STORAGE

(71) Applicant: EMC IP Holding Company LLC, Hopkinton, MA (US)

(72) Inventors: Mikhail Danilov, Saint Petersburg (RU); Andrey Kurilov, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/965,479

(22) Filed: Apr. 27, 2018

(65) Prior Publication Data

US 2019/0332266 A1 Oct. 31, 2019

(51) Int. Cl.
  *G06F 3/06* (2006.01)
(52) U.S. Cl.
  CPC .............. *G06F 3/065* (2013.01); *G06F 3/067* (2013.01); *G06F 3/0619* (2013.01); *G06F 3/0629* (2013.01)
(58) Field of Classification Search
  CPC ........ G06F 3/067; G06F 3/065; G06F 3/0619; G06F 3/0629
  USPC ...................................................... 711/165
  See application file for complete search history.

(56) References Cited

U.S. PATENT DOCUMENTS

| | | | |
|---|---|---|---|
| 5,675,802 A | 10/1997 | Allen et al. | |
| 5,805,788 A | 9/1998 | Johnson | |
| 7,389,393 B1 | 6/2008 | Karr et al. | |
| 8,370,542 B2 | 2/2013 | Lu et al. | |
| 8,495,465 B1 | 7/2013 | Anholt et al. | |
| 8,832,234 B1 | 9/2014 | Brooker et al. | |
| 8,972,478 B1* | 3/2015 | Storer | G06F 3/061 |
| | | | 709/201 |
| 9,063,838 B1* | 6/2015 | Boyle | G06F 12/02 |
| 10,361,810 B2 | 7/2019 | Myung et al. | |
| 2002/0166026 A1 | 11/2002 | Ulrich et al. | |
| 2005/0140529 A1 | 6/2005 | Choi et al. | |
| 2006/0047896 A1 | 3/2006 | Nguyen et al. | |

(Continued)

OTHER PUBLICATIONS

Office Action dated Nov. 16, 2018 for U.S. Appl. No. 15/662,273, 19 pages.

(Continued)

*Primary Examiner* — Hua J Song
(74) *Attorney, Agent, or Firm* — Amin, Turocy & Watson, LLP

(57) ABSTRACT

Scaling-in of a geographically diverse data storage system is disclosed. Data chunks stored in storage devices of different zones can be convolved to conserve memory. The zone storage system can be a geographically diverse storage system. Removing a zone from the geographically diverse data storage system can risk data loss without adequate replication of data from the zone to be removed. The zone to be removed can be placed in a 'read-only' state. Data chunks form the zone to be removed can be duplicated at other zones of the geographically diverse data storage system. A data chunk comprising convolved representations of data is duplicated to a zone in a manner that results in loss of geographical diversity, a corresponding chunk can be duplicated at another zone to restore geographical diversity. Validation of data can be performed prior to removal of a zone in a scaling-in event.

20 Claims, 10 Drawing Sheets

(56) References Cited

U.S. PATENT DOCUMENTS

| | | |
|---|---|---|
| 2006/0075007 A1 | 4/2006 | Anderson et al. |
| 2007/0239759 A1 | 10/2007 | Shen et al. |
| 2008/0320061 A1 | 12/2008 | Aszmann et al. |
| 2009/0259882 A1 | 10/2009 | Shellhamer |
| 2010/0031060 A1 | 2/2010 | Chew et al. |
| 2010/0332748 A1 | 12/2010 | Van der Goot et al. |
| 2011/0138148 A1 | 6/2011 | Friedman et al. |
| 2011/0246503 A1 | 10/2011 | Bender et al. |
| 2012/0023291 A1 | 1/2012 | Zeng et al. |
| 2012/0204077 A1 | 8/2012 | D'Abreu et al. |
| 2012/0317234 A1 | 12/2012 | Bohrer et al. |
| 2013/0054822 A1 | 2/2013 | Mordani et al. |
| 2013/0088501 A1 | 4/2013 | Fell |
| 2013/0097470 A1 | 4/2013 | Hwang et al. |
| 2013/0246876 A1 | 9/2013 | Manssour et al. |
| 2014/0280375 A1 | 9/2014 | Rawson et al. |
| 2014/0380088 A1 | 12/2014 | Bennett et al. |
| 2014/0380125 A1 | 12/2014 | Calder et al. |
| 2016/0055054 A1 | 2/2016 | Patterson, III et al. |
| 2016/0328295 A1 | 11/2016 | Baptist et al. |
| 2016/0357649 A1 | 12/2016 | Karrotu et al. |
| 2016/0371145 A1 | 12/2016 | Akutsu et al. |
| 2016/0380650 A1 | 12/2016 | Calder et al. |
| 2017/0003880 A1 | 1/2017 | Fisher et al. |
| 2017/0102993 A1 | 4/2017 | Hu et al. |
| 2018/0063213 A1 | 3/2018 | Bevilacqua-Linn et al. |
| 2018/0129417 A1 | 5/2018 | Sivasubramanian et al. |
| 2018/0181324 A1 | 6/2018 | Daniliv et al. |
| 2018/0181612 A1 | 6/2018 | Daniliv et al. |
| 2019/0028179 A1 | 1/2019 | Kalhan |

OTHER PUBLICATIONS

Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Non-Final Office Action received for U.S. Appl. No. 15/651,504 dated Mar. 21, 2019, 10 pages.
Final Office Action received for U.S. Appl. No. 15/662,273 dated May 15, 2019, 33 pages.
"Standard Raid Levels—Raid 6" Wikipedia. [https://en.wikipedia.org/wiki/Standard_RAID_levels#RAID_6], retreived Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed Raid—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.

* cited by examiner

SCALING-IN FOR GEOGRAPHICALLY DIVERSE STORAGE

TECHNICAL FIELD

The disclosed subject matter relates to geographically diverse storage of data, and more particularly, to preserving data integrity for a geographically diverse storage scaling-in event.

BACKGROUND

Conventional data storage techniques can employ convolution and deconvolution of data to conserve storage space. As an example, convolution can allow data, to be packed or hashed in a manner that uses less space that the original data. Moreover, convolved data, e.g., a convolution of first data and second data, etc., can typically be deconvolved to the original first data and second data can typically be deconvolved to the original first data and second data, a convolution of first data and second data that is then convolved with a third data can then be deconvolved to the convolved first and second data and the original third data, etc. One use of data storage is in bulk data storage. Examples of bulk data storage can include networked storage, e.g., cloud storage, for example Elastic Cloud Storage offered by Dell EMC. Bulk storage can, in an aspect, manage disk capacity via partitioning of disk space into blocks of fixed size, frequently referred to as 'data chunks', 'chunks', etc., for example a 128 MB chunk, etc. Chunks can be used to store user data, and the chunks can be shared among the same or different users, for example, one chunk may contain fragments of several user objects. A chunk's content can generally be modified in an append-only mode to prevent overwriting of data already added to the chunk. As such, when a typical chunk becomes full enough, it can be 'sealed' so that the data therein is generally not able for further modification. These chunks can be then stored in a geographically diverse manner to allow for recovery of the data where a first copy of the data is destroyed, e.g., disaster recovery, etc.

DETAILED DESCRIPTION

Figure 1:
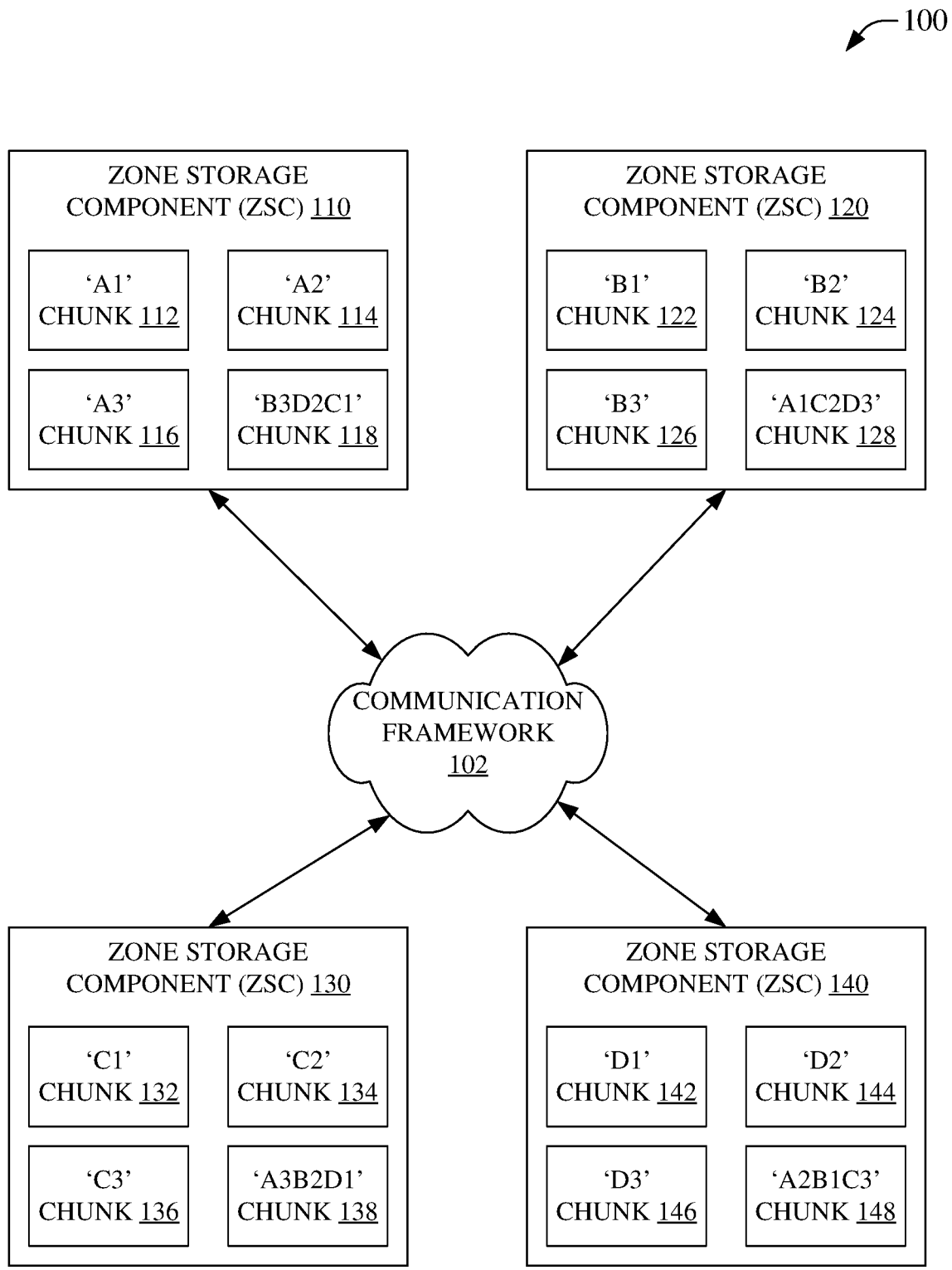
FIG. 1 is an illustration of an example system that can facilitate geographically diverse storage of data via a communication framework, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can employ convolution and deconvolution to conserve storage space. Blocks of data, hereinafter 'data chunks', or simply 'chunks', can be used to store user data. Chunks can be shared among the same or different users, e.g., a typical chunk can contain fragments of different user data objects. Chunk contents can be modified, for example, in an append-only mode to prevent overwriting of data already added to the chunk, etc. As such, for a typical append-only chunk that is determined to be full, the data therein is generally not able to be further modified. Eventually the chunk can be stored 'off-site', e.g., in a geographically diverse manner, to provide for disaster recovery, etc. Chunks from a data storage device located in a first geographic location, hereinafter a 'zone storage component', 'zone storage device', 'zone', etc., can be stored in a second zone storage device that is located at a second geographic location different from the first geographic location. This can enable recovery of data where the first zone storage device is damaged, destroyed, offline, etc., e.g., disaster recovery of data, by accessing the off-site data from the second zone storage device. Adding additional zones is generally relatively straight forward, however removing a zone that stores data is typically more complex. Removing a zone from a group of zones storing data in a geographically diverse manner, e.g., 'scaling-in', etc., typically involves copying all of the data represented at the zone to be removed from other zones that have copies of the stored chunks, e.g., via a 'recover-type process'. This can involve a number of data transfers to recover the data that was represented on the zone that is removed. In an aspect, the present disclosure can improve the process of scaling-in. The improvements can include having fewer data transfers to achieve the removal of a zone while preserving data integrity.

Geographically diverse data storage can use data compression to store data. As an example, a back-end storage device in Topeka can store a backup of data from a first zone storage device in Houston, e.g., Topeka can be considered geographically diverse from Houston. As a second example, data chunks from Seattle and San Jose can be stored in Denver. The example Denver storage can be compressed or uncompressed, wherein uncompressed indicates that the Seattle and San Jose chunks are replicated in Denver, and wherein compressed indicates that the Seattle and San Jose chunks are convolved, for example via an 'XOR' operation, into a different chunk to allow recovery of the Seattle or San Jose data from the convolved chunk, but where the convolved chunk typically consumes less storage space than the sum of the storage space for both the Seattle and San Jose chunks individually. Compression, therefore, can allow original data to be recovered from a compressed chunk that consumes less storage space than storage of the uncompressed data chunks. This can be beneficial in that data from a location can be backed up by redundant data in another location via a compressed chunk, wherein a redundant data chunk can be smaller than the sum of the data chunks contributing to the compressed chunk. As such, local chunks, e.g., chunks from different zone storage devices, can be compressed via a convolution technique to reduce the amount of storage space used by a compressed chunk at a geographically distinct location.

Compression of chunks can be performed by different compression technologies. Logical operations can be applied to chunk data to allow compressed data to be recoverable, e.g., by reversing the logical operations to revert to the initial chunk data. As an example, data from chunk 1 can undergo an exclusive-or operation, hereinafter 'XOR', with data from chunk 2 to form chunk 3. While other logical operations can be employed in compression of chunks, those operations are generally beyond the scope of the presently disclosed subject matter and, for clarity and brevity, only the XOR operator will be illustrated herein. However, it is noted that the disclosure is not so limited and that other operations or combinations of operations can be substituted without departing from the scope of the present disclosure. As such, all logical operations for compression germane to the disclosed subject matter are to be considered within the scope of the present disclosure even where not explicitly recited for the sake of clarity and brevity.

In an aspect, the presently disclosed subject matter can include 'zones'. A zone can correspond to a geographic location or region. As such, different zones can be associated with different geographic locations or regions. As an example, Zone A can comprise Seattle, Wash., Zone B can comprise Dallas, Tex., and, Zone C can comprise Boston, Mass. In this example, where a chunk from Zone A is replicated in Zone C, an earthquake in Seattle can be less likely to damage the replicated data in Boston. Moreover, a chunk from Dallas can be convolved with the Seattle chunk, resulting in a compressed/convolved chunk which can be stored in Boston. As such, either the chunk from Seattle or Dallas can be used to deconvolve the chunk stored in Boston to recover the full set of both the Seattle and Dallas local data chunks. The convolved Boston chunk can consume less disk space than a sum of the Seattle and Dallas local chunks. An example technique can be "exclusive or" convolution, hereinafter 'XOR', '$\oplus$', etc., where the data in the Seattle and Dallas chunks can be convolved by XOR processes to form the Boston chunk, e.g., $C=A1 \oplus B1$, where A1 is a replica of the Seattle chunk, B1 is a replica of the Dallas chunk, and C is the convolution of A1 and B1. Of further note, the disclosed subject matter can further be employed in more or fewer zones, in zones that are the same or different than other zones, in zones that are more or less geographically diverse, etc. As an example, the disclosed subject matter can be applied to data of a single disk, memory, drive, data storage device, etc., without departing from the scope of the disclosure, e.g., the zones can represent different logical areas of the single disk, memory, drive, data storage device, etc. Moreover, it will be noted that convolved chunks can be further convolved with other data, e.g., $D=C1 \oplus E1$, etc., where E1 is a replica of, for example, a Miami chunk, E, C1 is a replica of the Boston chunk, C, from the previous example and D is an XOR of C1 and E1 located, for example, in Fargo.

In an aspect, XORs of data chunks in disparate geographic locations can provide for deconvolution of the XOR data chunk to regenerate the input data chunk data. Continuing a previous example, the Fargo chunk, D, can be deconvolved into C1 and E1 based on either C1 or D1; the Miami chunk, C, can be deconvolved into A1 or B1 based on either A1 or B1; etc. Where convolving data into C or D comprises deletion of the replicas that were convolved, e.g., A1 and B1, or C1 and E1, respectively, to avoid storing both the input replicas and the convolved chunk, deconvolution can rely on retransmitting a replica chunk that so that it can be employed in deconvolving the convolved chunk. As an example the Seattle chunk and Dallas chunk can be replicated in the Boston zone, e.g., as A1 and B1. The replicas, A1 and B1 can then be convolved into C. Replicas A1 and B1 can then be deleted because their information is redundantly embodied in C, albeit convolved, e.g., via an XOR process, etc. This leaves only chunk C at Boston as the backup to Seattle and Dallas. If either Seattle or Dallas is to be recovered, the corollary input data chunk can be used to deconvolve C. As an example, where the Seattle chunk, A, is corrupted, the data can be recovered from C by deconvolving C with a replica of the Dallas chunk B. As such, B can be replicated by copying B from Dallas to Boston as B1, then deconvolving C with B1 to recover A1, which can then be copied back to Seattle to replace corrupted chunk A.

In some circumstances, disk space management can seek to recover underutilized disk space. As an example, where the Seattle chunk, A, is to be deleted, recovery of the Dallas chunk, B, via Boston convolved chunk, C, becomes dependent on having a copy of B to deconvolve C with after A has been deleted. As such, it can be desirable to deconvolve C into A1 and B1 prior to deleting A and A1, such that B1 can be convolved with another chunk, for example Miami chunk, E. As such, recovery of B1 can be based on E1 and the XOR of B1E1. Also of note, to deconvolve C in to A1 and B1, a replica of A, e.g., A1 is made in Boston, this allows recovery of B1. Once B1 is recovered, C, A1, and A can be deleted. Then B1 can be convolved with E1. It will be noted that data is transferred, e.g., A is copied into A1 from Seattle to Boston, to allow C to be deconvolved.

In an embodiment of the disclosed subject matter, a first zone to be removed can be placed in a different operational state, for example a read only state, etc., that can allow for a data chunk of the first zone to be duplicated at other zones. A duplicated data chunk, once stored at another zone can then serve a similar purpose as when it was stored at the first zone, e.g., for disaster recovery, etc. Moreover, where the data chunk comprises convolved data, the duplicated data chunk can be altered to comport with a geographically diverse data storage scheme for fewer zones. This can enable removal of the first zone while maintaining data integrity and proper data chunk redundancy, even with convolved data chunk(s).

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate geographically diverse storage of data via a communication framework, in accordance with aspects of the subject disclosure. System 100 can comprise zone storage components (ZSCs), e.g., ZSC 110-140, etc. The ZSCs can communicate with the other ZSCs of system 100, e.g., via communication framework 102. Communication framework 102 can comprise wired connections, wireless connections, or combinations thereof. As an example communication framework 102 can comprise a millimeter wavelength link from ZSC 210 to a base station, not illustrated, connected via the internet, not illustrated, and via a local area network, not illustrated, to ZSC 220, etc. In an embodiment, a geographically diverse storage system can comprise system 100.

ZSCs 110-140 can receive user data that becomes part of a data chunk, e.g., chunks 112-118, 122-128, 132-138, 142-148, etc. In an embodiment, a data chunk can comprise convolved data corresponding to other data chunks, e.g., a data chunk can be an XOR of other data chunks. As an example, 'B3D2C1' data chunk 118 can comprise convolved data corresponding to 'B3' data chunk 126, 'D2' data chunk 144, and 'C1' data chunk 132. The convolution of B3D2C1 can be an XOR of B3, D2, and C1, can be an XOR of B3 and D2 that is then XOR'ed with C1, can be an XOR of D2 and C1 that is then XOR'ed with B3, or nearly any other permutation of XOR or other convolution processes.

System 100 can enable data recovery. In an embodiment, chunk 126 can be recovered based on chunk 118, chunk 144 can be recovered based on chunk 118, chunk 132 can be recovered based on chunk 118, etc. Similarly, other chunks can be recovered based on other duplicates of the same chunk or can be extracted, e.g., via deconvolution, from other appropriate convolved chunks, such as chunk 128, chunk 138, chunk 148, etc. As an example, where ZSC 110 becomes unavailable, e.g., experiences a disaster, power loss, data corruption, etc., chunks 112-114 can be recovered from chunks 128, 138, and 148. Moreover, in this example, chunk 118 can be recovered based on chunks 126, 144, and 132. Continuing the example, to recover chunk 112, chunk 128 can be deconvolved based on chunk 128 and chunks 134 and 146, e.g., chunks 134 and 146 can be duplicated at ZSC 120 and used to deconvolve chunk 128 to recover a version of chunk 112, which process can be, for example, viewed as ((('A1C2D3' XOR 'C2') XOR 'D3')='A1'). Other appropriate deconvolution techniques can similarly be employed to recover 'A1' without departing from the scope of the instant disclosure.

In an aspect, beyond recovery of data chunks, for example in disaster recovery, a zone can be removed from a geographically diverse data storage system, e.g., the geographically diverse data storage system can be scaled-in. Scaling-in a geographically diverse data storage system can be performed for nearly any reason, such as interaction with a zone that is facilitated by removing the zone, temporarily, permanently, in-part, in-whole, etc. As an example, the interaction with a zone can be planned (or unplanned) maintenance of the zone that is easier to perform after removing the zone from the geographically diverse data storage system, such that it can be desirable to scale-in the geographically diverse data storage system prior to performing the maintenance. Numerous other examples of interaction with the zone that are facilitated by removing the zone will be appreciated and are considered within the scope of the present disclosure despite not being recited for the sake of clarity and brevity.

It can be preferable to preserve data redundancy for a scaling-in of a geographically diverse data storage system. Where ZSCs are located in geographically diverse locations, the possibility of complete data loss is generally reduced, e.g., where a first ZSC is in Seattle, a second ZSC is in San Jose, and a third ZSC is in Boston, etc., an earthquake in Seattle can damage data chunks stored at the Seattle ZSC, but is unlikely to affect chunks stored at the other ZSCs because they are likely located far from the earthquake in Seattle, however, where the Boston ZSC is removed via a scaling-in, this can endanger recovery of the Seattle ZSC chunks unless the chunks of the Boston ZSC are properly preserved prior to removal of the Boston ZSC from the geographically diverse data storage system. System 100 can facilitate duplication of data from a ZSC to other ZSCs in a manner that can preserve data redundancy in accordance with changes to a morphology of a geographically diverse data storage system. As an example, a state of a first data zone to be removed, as part of scaling-in a geographically diverse data storage system, can be set, for example, to a read-only state, data chunks from the first data zone can be duplicated at other ZSCs, the duplicate chunks can be employed to adapt a chunk(s) located at a zone of the other ZSCs, and the first data zone can be removed while preserving data redundancy.

Figure 2:
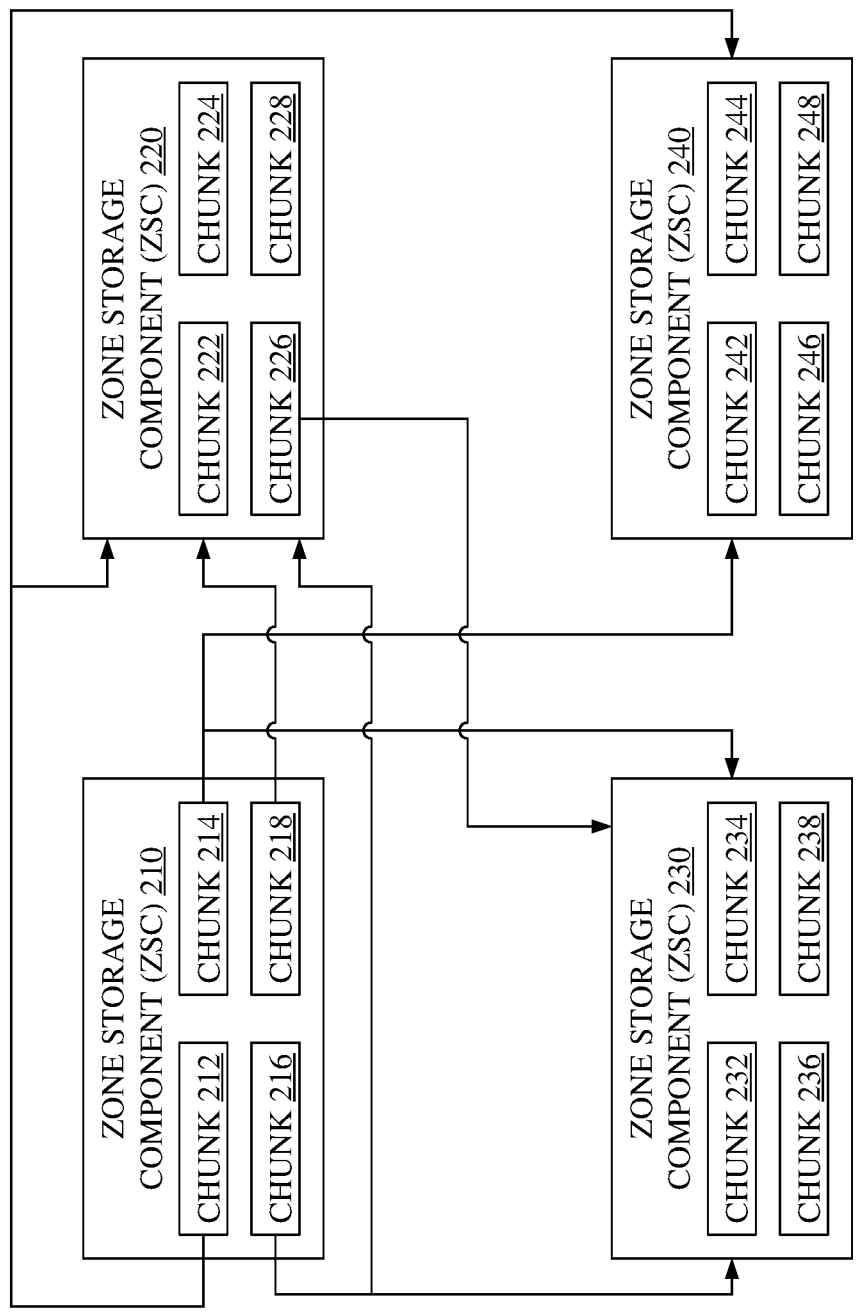
FIG. 2 is an illustration of an example system that can facilitate scaling-in for geographically diverse storage of data, in accordance with aspects of the subject disclosure.

FIG. 2 is an illustration of a system 200, which can enable scaling-in for geographically diverse storage of data, in accordance with aspects of the subject disclosure. System 200 can comprise, for example, four zones with corresponding ZSCs, e.g., ZSC 210-240. The ZSCs can be communicatively coupled via a communication framework, not shown. ZSCs, e.g., ZSC 210-240, can move, duplicate, copy, access, etc., data from other ZSCs via the communication framework.

In an embodiment, system 200 can convolve, compress, hash, etc., data chunks from some of zones 210-240 into a data chunk on another of zones 210-240, for example, chunks 226, 244, and 232, of ZSCs 220, 230, and 240 respectively, can be convolved into data chunk 218 of ZSCS 210. In some embodiments, chunks can be convolved at a zone that will hold a resulting convolved chunk, e.g., ZSC 210 can convolve chunks 226, 244, and 232 into data chunk 218 at ZSC 210. In some embodiments, another device chunks can convolve chunks into a resulting convolved chunk that can be stored at a zone, e.g., a device other than ZSC 210 can convolve chunks 226, 244, and 232 into data chunk 218 that can then be stored at ZSC 210. In some embodiments, the other device can be a device other than ZSC 210, 220, 230, or 240. As previously noted, convolution of multiple chunks can be performed by any permutation germane to the present disclosure, e.g., chunks 226, 244, and 232 can be XORed, chunks 226 and 244 can be XORed and the result can then be XORed with chunk 232, etc. In an embodiment, chunks can be accessed, duplicated, copied, etc., in whole or in part, between zones, for example, chunk 212 can be duplicated from ZSC 210 to ZSC 220, 240, etc.

System 200 illustrates an example duplication of data chunks from ZSC 210 that facilitates scaling-in, by removal of ZSC 210, of a geographically diverse storage system comprising ZSCs 210-240. In an aspect, data chunks 212-218 can be duplicated from ZSC 210 to ZSCs 220-240 as illustrated. In an embodiment, a first duplicate of a data chunk can be regarded as a primary duplicate and a second duplicate of the data chunk at another ZSC can be regarded as a backup duplicate or secondary duplicate. In some embodiments, validation of the duplicate, or duplicates, can be performed, e.g., to indicate that the duplication(s) were successfully performed prior to removal of the source ZSC, e.g., duplicate(s) of the data chunks from ZSC 210 can be validated prior to removing ZSC 210 via the presently disclosed scaling-in technology. As illustrated, in system 200, the example duplication of data chunks 212-218 of ZSC 210 can result in a primary and backup duplicate of data chunks 212-218 across corresponding ZSCs 220-240.

In some embodiments, duplication of a data chunk can result in another ZSC zone having a backup of a data chunk that is also resident on the same ZSC, with no backup copy on a further other ZSC. As an example, where ZSC 210 holds chunk 218, and chunk 218 comprises convolved data representing 'B3D2C1', chunk 218 can be duplicated at ZSC 220, further, where ZSC 220 data chunk 226 represents data 'B3', ZSC 220 can hold both 'B3' and the 'backup of B3', e.g., where 'B3' is convolved in 'B3D2C1'. Accordingly, chunk 226 can be duplicated, for example, at ZSC 230, etc., to provide a 'backup of B3' on at another zone, e.g., ZSC 230, etc. In an aspect, the duplicate of chunk 218, resident on ZSC 220 in the foregoing example, can be deconvolved to remove 'B3' from 'B3D2C1', resulting in an altered duplicate of the convolved data chunk now representing 'D2C1'. This can result in less consumed storage space at ZSC 220, e.g., storing chunks 222-228, duplicates of chunks 212-216, and an altered duplicate of chunk 218 (representing 'D2C1'), can use less storage space than chunks 222-228, duplicates of chunks 212-216, and a duplicate of chunk 218 (representing 'B3D2C1'), more especially where ZSC 220 already stores chunk 226 that comprises data for 'B3' and further storing 'B3D2C1' would be, to a degree, redundant. It is noted that duplication of ZSC 210 data chunks can be different than the illustrated example shown in system 200, e.g., a primary and backup duplicate of chunk 212 can be stored at ZSCs other than ZSC 220 and 240, etc., without departing from the scope of the present disclosure but is not illustrated for the sake of clarity and brevity.

Figure 3:
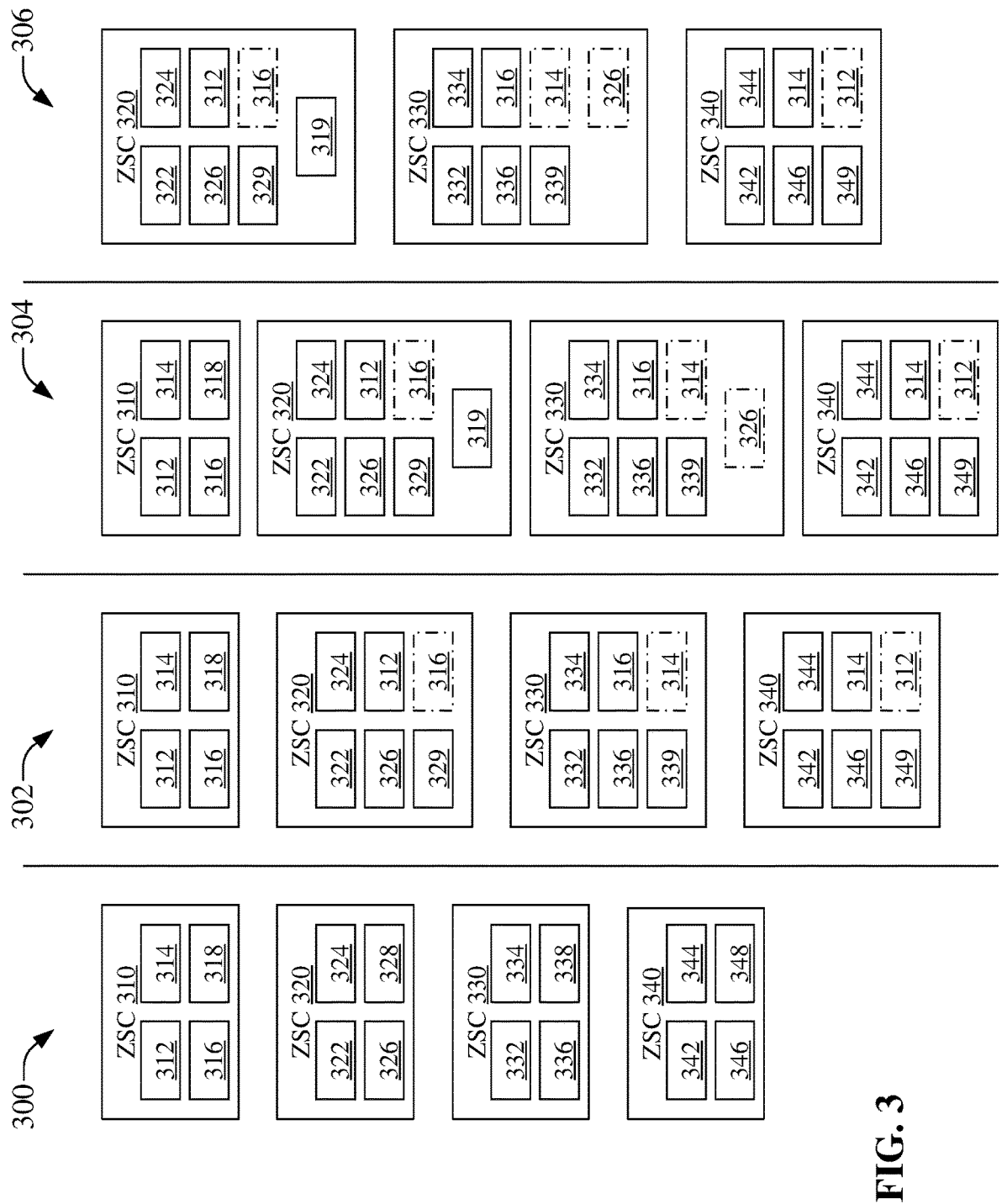
FIG. 3 is an illustration of example system states for scaling-in of geographically diverse storage of data, in accordance with aspects of the subject disclosure.

FIG. 3 is an illustration of example system states, 300-306, for scaling-in of geographically diverse storage of data, in accordance with aspects of the subject disclosure. Duplication of data from a first ZSC in a first zone can be illustrated by various example operational states, e.g., system states 400-406, etc., of ZSCs, e.g., ZSC 310-340, etc., comprised in a geographically diverse data storage system. In an example first state 300, ZSC 310 can comprise data chunks 312-318, ZSC 320 can comprise data chunks 322-328, ZSC 330 can comprise data chunks 332-338, and ZSC 340 can comprise data chunks 342-348. In an embodiment, data chunks 318, 328, 338, and 348 can represent convolved data, e.g., the same as or similar to chunks 118, 128, 138, 148, etc. The convolved chunks can comprise convolved data that can be employed to recover data chunks of other ZSCs, e.g., disaster recovery, etc.

Data from ZSC 310 can be duplicated into other ZSCs, for example, as illustrated in portions of FIG. 2, which can result in another example system state 302. In example system state 302, data chunk 312 of ZSC 310 is shown as being duplicated at both ZSC 320 and ZSC 340, the duplicate 312 at 320 can be considered a primary duplicate and the duplicate 312 at 340 can be considered a backup duplicate. Similarly, data chunk 314 of ZSC 310 in example system state 302 is shown as being a primary duplicate at ZSC 340 and a backup duplicate at ZSC 330. Further, data chunk 316 of ZSC 310 in example system state 302 is illustrated as a primary duplicate at ZSC 330 and a backup duplicate at ZSC 320. Where data chunks 312-316 can, in some embodiments, represent unconvolved data, duplication to other zones, e.g., in ZSCs of other zones, can provide a desired redundancy of data in a geographically distributed manner, facilitating recovery of the duplicated data where needed.

At example system state 304, data chunk 318 of ZSC 310 can be duplicated (not shown), for example, at ZSC 320, and in some embodiments can be modified, resulting in data chunk 319. Modification of the duplicate of data chunk 318 can serve to reduce storage space used on ZSC 320. In an aspect, data chunk 318 can represent convolved data, e.g., data chunk 318 can be the same as or similar to 'B3D2C1' data chunk 118, wherein data chunk 318 can represent convolved data corresponding to data chunks of other ZSCs comprising the geographically distributed data storage system. As an example, where data chunk 318 represents convolved data, such as 'B3D2C1' where 'B3' is represented by chunk 326, 'D2' is represented by chunk 344, and 'C1' is represented by chunk 332, the duplicate of chunk 318 stored at ZSC 320 can already comprise data represented by chunk 326 of ZSC 320. As such, the duplicate of chunk 318 can be deconvolved sufficiently to remove 'B3' from the data representation, resulting in data chunk 319 representing, in this example, 'D2C1'. Moreover, where 'B3', e.g., chunk 326, resides on ZSC 320, it is subject to loss where access to ZSC 320 is compromised. Accordingly, chunk 326 can be duplicated, for example, at ZSC 330 to provide geographic diversity via a duplicate stored at a geographically diverse zone.

At example system state 304, the data of ZSC 310 can be considered fully protected in the other ZSCs of the geographically diverse data storage system. As such, the data chunks of ZSC 310 can therefore be redundant. At example system state 306, ZSC 310 can be removed from the geographically diverse data storage system without loss of data protection wherein the data stored at ZSC 310 is reproduced at other geographically diverse zones to afford protection to the data.

Figure 4:
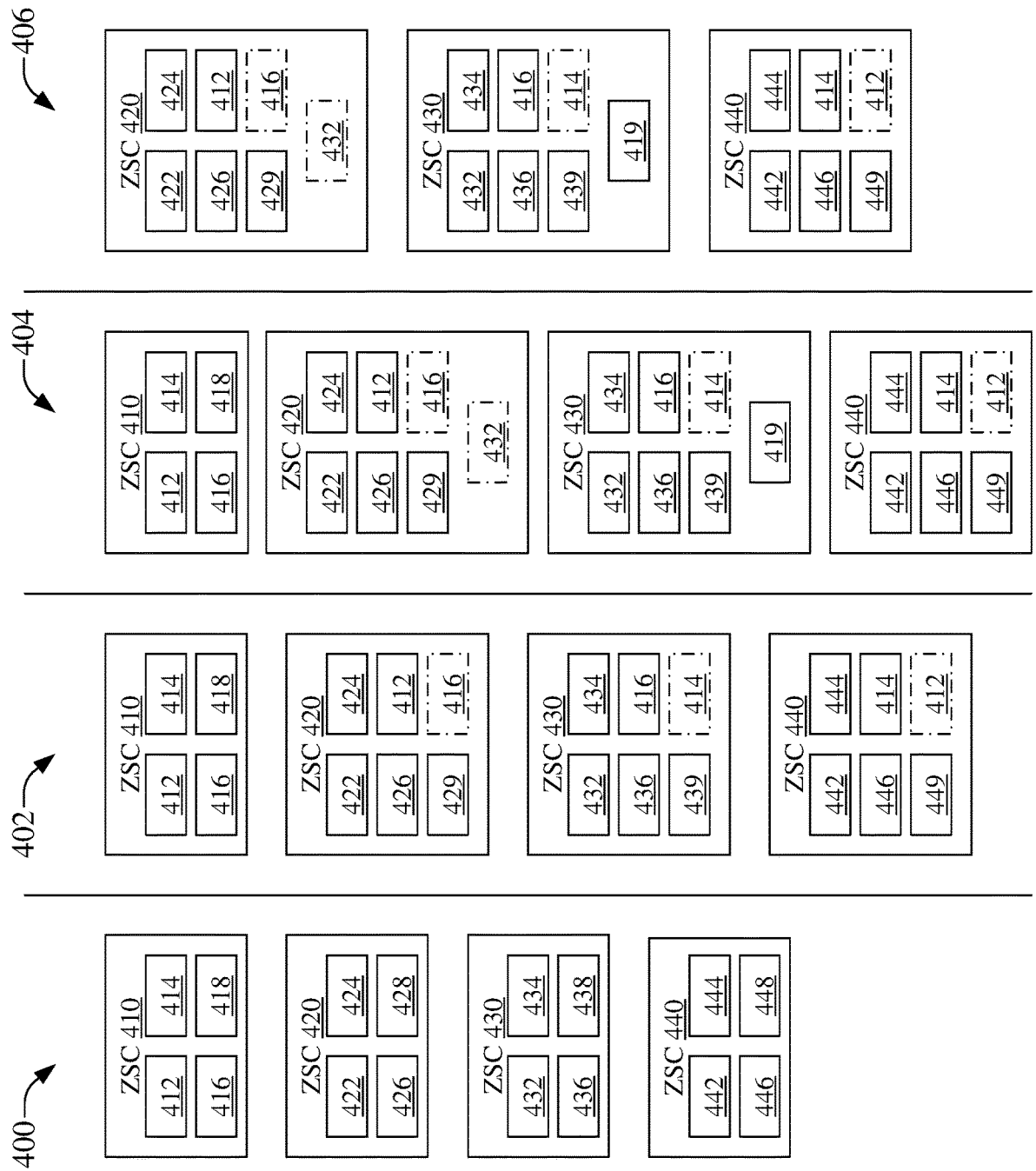
FIG. 4 is an illustration of example system states for scaling-in of geographically diverse storage of data, in accordance with aspects of the subject disclosure.

FIG. 4 is an illustration of example system states, 400-406, for scaling-in of geographically diverse storage of data, in accordance with aspects of the subject disclosure. Example first state 400 illustrates ZSC 410 comprising data chunks 412-418, ZSC 420 can comprise data chunks 422-428, ZSC 430 can comprise data chunks 432-438, and ZSC 440 can comprise data chunks 442-448. In an embodiment, data chunks 418, 428, 438, and 448 can represent convolved data, e.g., the same as or similar to chunks 118, 128, 138, 148, etc. The convolved chunks can comprise convolved data that can be employed to recover data chunks of other ZSCs, e.g., disaster recovery, etc.

Data from ZSC 410 can be duplicated into other ZSCs, for example, as illustrated in portions of FIG. 2, which can result in another example system state 402. In example system state 402, data chunk 412 of ZSC 410 is shown as being duplicated at both ZSC 420 and ZSC 440, the duplicate 412 at 420 can be considered a primary duplicate and the duplicate 412 at 440 can be considered a backup duplicate. Similarly, data chunk 414 of ZSC 410 in example system state 402 is shown as being a primary duplicate at ZSC 440 and a backup duplicate at ZSC 430. Further, data chunk 416 of ZSC 410 in example system state 402 is illustrated as a primary duplicate at ZSC 430 and a backup duplicate at ZSC 420. Where data chunks 412-416 can, in some embodiments, represent unconvolved data, duplication to other zones, e.g., in ZSCs of other zones, can provide a desired redundancy of data in a geographically distributed manner, facilitating recovery of the duplicated data where needed.

At example system state 404, data chunk 418 of ZSC 410 can be duplicated (not shown), for example, at ZSC 430, and in some embodiments can be modified, resulting in data chunk 419. Modification of the duplicate of data chunk 418 can serve to reduce storage space used on ZSC 430. In an aspect, data chunk 418 can represent convolved data, e.g., data chunk 418 can be the same as or similar to 'B3D2C1' data chunk 118, wherein data chunk 418 can represent convolved data corresponding to data chunks of other ZSCs comprising the geographically distributed data storage system. As an example, where data chunk 418 represents convolved data, such as 'B3D2C1' where 'B3' is represented by chunk 426, 'D2' is represented by chunk 444, and 'C1' is represented by chunk 432, the duplicate of chunk 418 stored at ZSC 430 can already comprise data represented by chunk 432 of ZSC 430. As such, the duplicate of chunk 418 can be deconvolved sufficiently to remove 'C1' from the data representation, resulting in data chunk 419 representing, in this example, 'B3D2'. Moreover, where 'C1', e.g., chunk 432, resides on ZSC 430, it is subject to loss where access to ZSC 430 is compromised. Accordingly, chunk 432 can be duplicated, for example, at ZSC 420 to provide geographic diversity via a duplicate stored at a geographically diverse zone.

At example system state 404, the data of ZSC 410 can be considered fully protected in the other ZSCs of the geographically diverse data storage system. As such, the data chunks of ZSC 410 can therefore be redundant. At example system state 406, ZSC 410 can be removed from the geographically diverse data storage system without loss of data protection wherein the data stored at ZSC 410 is reproduced at other geographically diverse zones to afford protection to the data.

Figure 5:
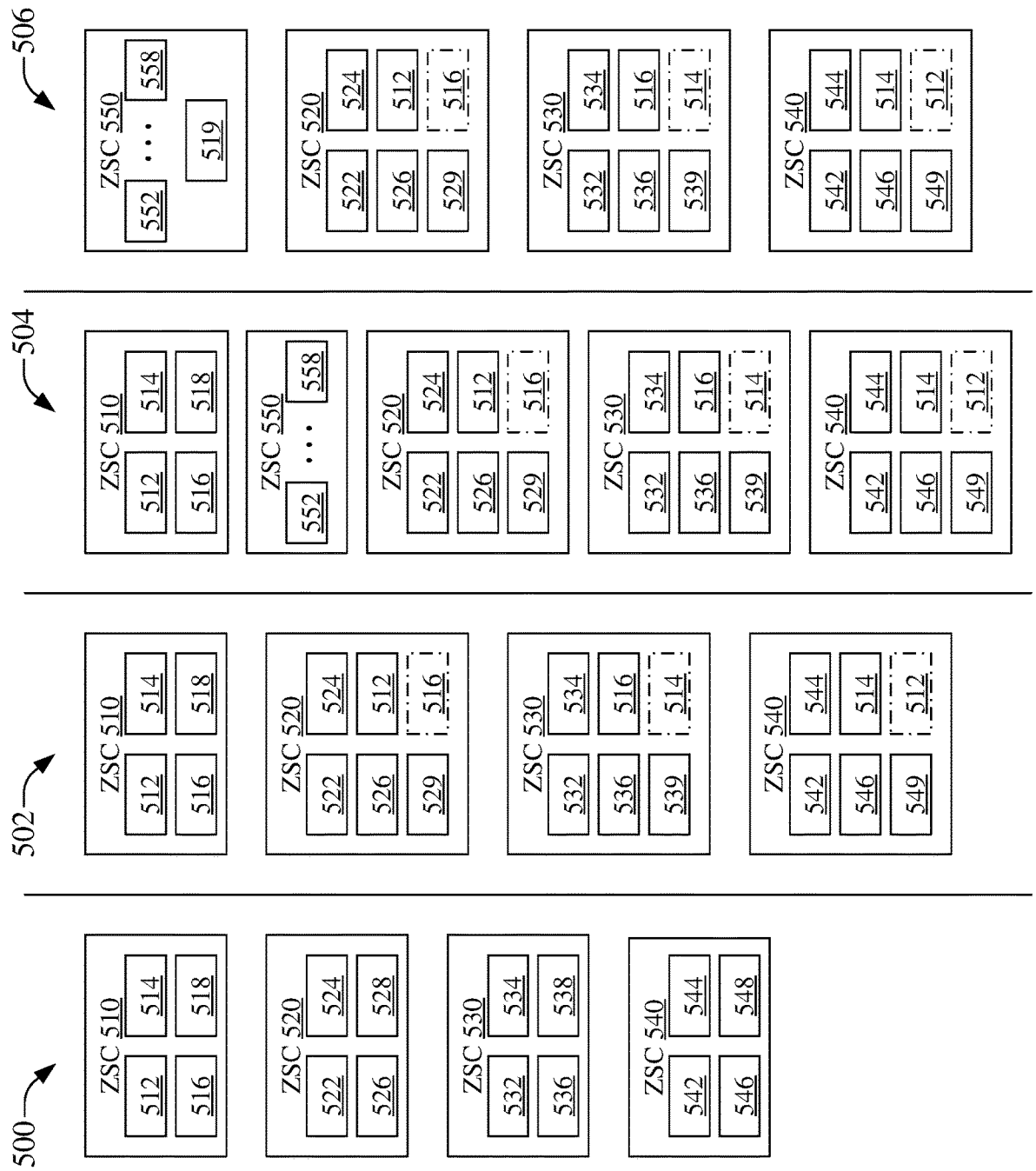
FIG. 5 illustrates example system states for scaling-in of geographically diverse storage of data employing an additional data storage zone, in accordance with aspects of the subject disclosure.

FIG. 5 is an illustration of example system states, 500-506, for scaling-in of geographically diverse storage of data, in accordance with aspects of the subject disclosure. Example first state 500 illustrates ZSC 510 comprising data chunks 512-518, ZSC 520 can comprise data chunks 522-528, ZSC 530 can comprise data chunks 532-538, and ZSC 540 can comprise data chunks 542-548. In an embodiment, data chunks 518, 528, 538, and 548 can represent convolved data, e.g., the same as or similar to chunks 118, 128, 138, 148, etc. The convolved chunks can comprise convolved data that can be employed to recover data chunks of other ZSCs, e.g., disaster recovery, etc.

Data from ZSC 510 can be duplicated into other ZSCs, for example, as illustrated in portions of FIG. 2, which can result in another example system state 502. In example system state 502, data chunk 512 of ZSC 510 is shown as being duplicated at both ZSC 520 and ZSC 540, the duplicate 512 at 520 can be considered a primary duplicate and the duplicate 512 at 540 can be considered a backup duplicate. Similarly, data chunk 514 of ZSC 510 in example system state 502 is shown as being a primary duplicate at ZSC 540 and a backup duplicate at ZSC 530. Further, data chunk 516 of ZSC 510 in example system state 502 is illustrated as a primary duplicate at ZSC 530 and a backup duplicate at ZSC 520. Where data chunks 512-516 can, in some embodiments, represent unconvolved data, duplication to other zones, e.g., in ZSCs of other zones, can provide a desired redundancy of data in a geographically distributed manner, facilitating recovery of the duplicated data where needed.

At example system state 504, a new ZSC, ZSC 550 comprising chunks 552-558, can be accessed. Data chunk 518 of ZSC 510 can be duplicated (not shown), for example, at ZSC 550. In an aspect, data chunk 518 can represent convolved data, e.g., data chunk 518 can be the same as or similar to 'B3D2C1' data chunk 118, wherein data chunk 518 can represent convolved data corresponding to data chunks of other ZSCs comprising the geographically distributed data storage system. As an example, where data chunk 518 represents convolved data, such as 'B3D2C1', duplication to ZSC 550, resulting in chunk 519 (see example system state 506), can preserve the convolved data 'B3D2C1' within the geographically diverse data storage system now comprising ZSCs 510-550, and can provide geographic diversity via the duplicate stored at ZSC 550.

Upon duplication of chunk 518 from ZSC 510, as chunk 519 at ZSC 550, the data of ZSC 510 can be considered fully protected in other ZSCs of the geographically diverse data storage system. As such, the data chunks of ZSC 510 can be redundant. At example system state 506, ZSC 510 can be removed from the geographically diverse data storage system without loss of data protection, wherein the data stored at ZSC 510 is reproduced at other geographically diverse zones to afford protection to the data, e.g., at ZSCs 520-550.

Figure 6:
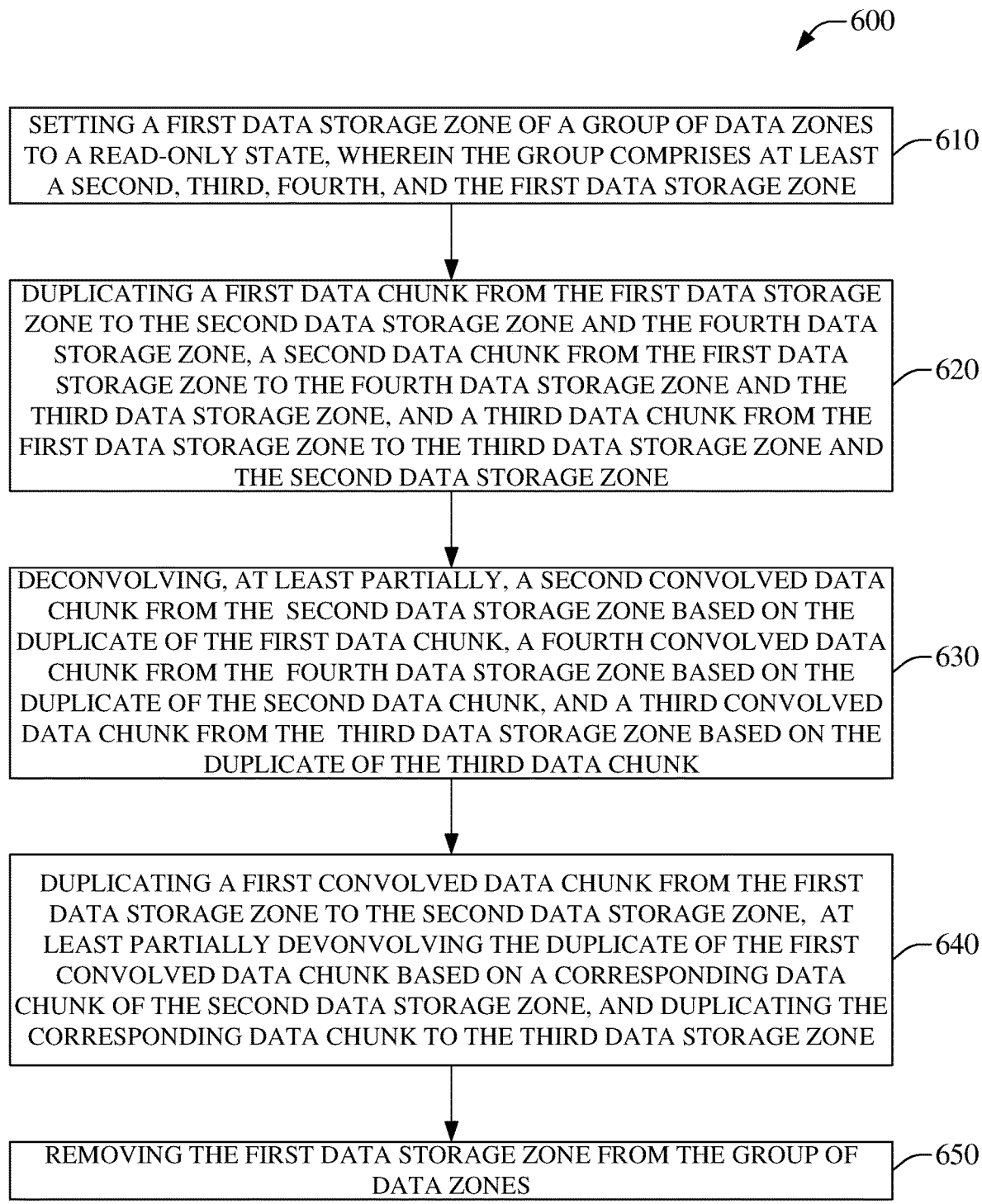
FIG. 6 is an illustration of an example method facilitating scaling-in for geographically diverse storage of data via a first morphology, in accordance with aspects of the subject disclosure.
Figure 7:
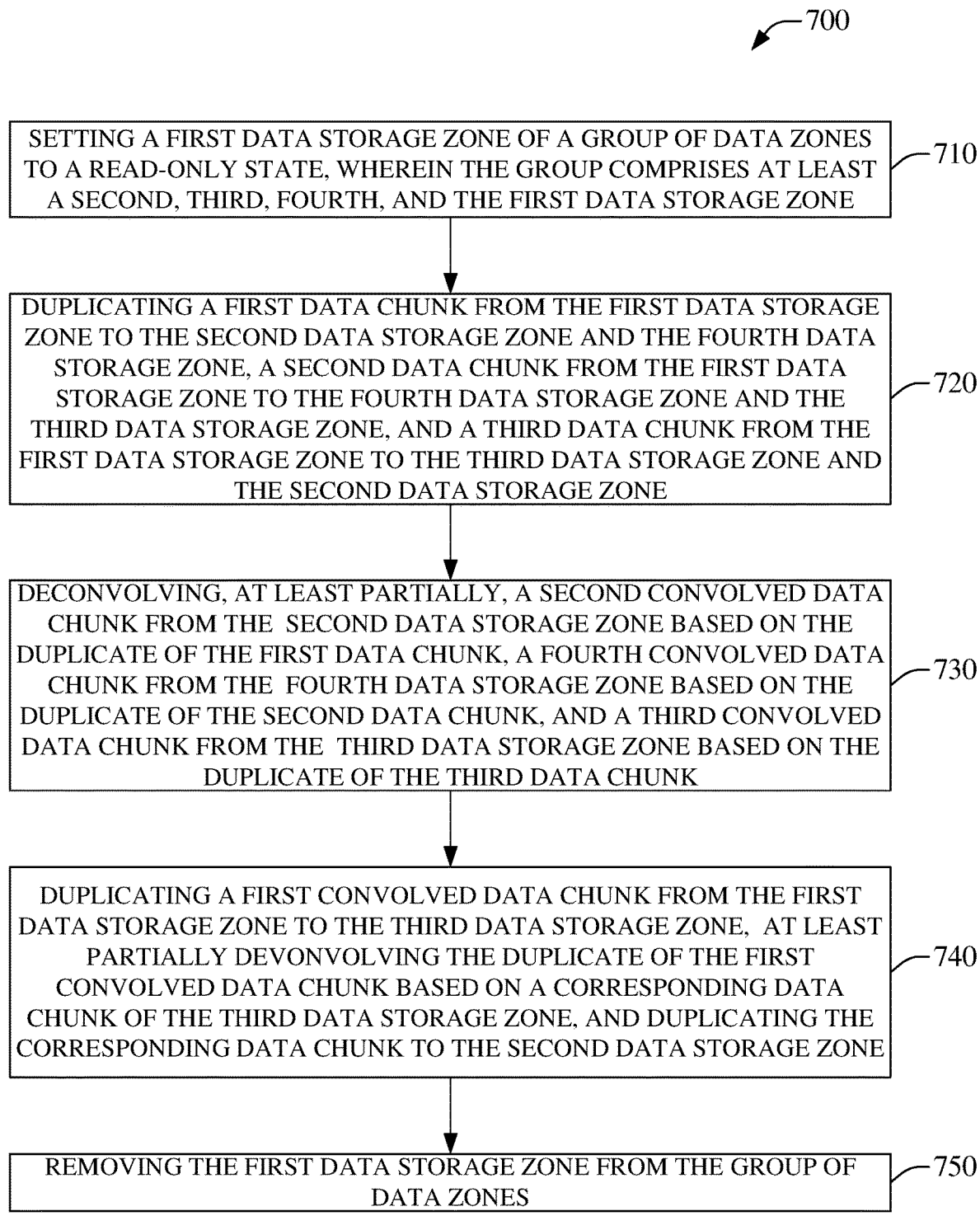
FIG. 7 is an illustration of an example method facilitating scaling-in for geographically diverse storage of data via a second morphology, in accordance with aspects of the subject disclosure.
Figure 8:
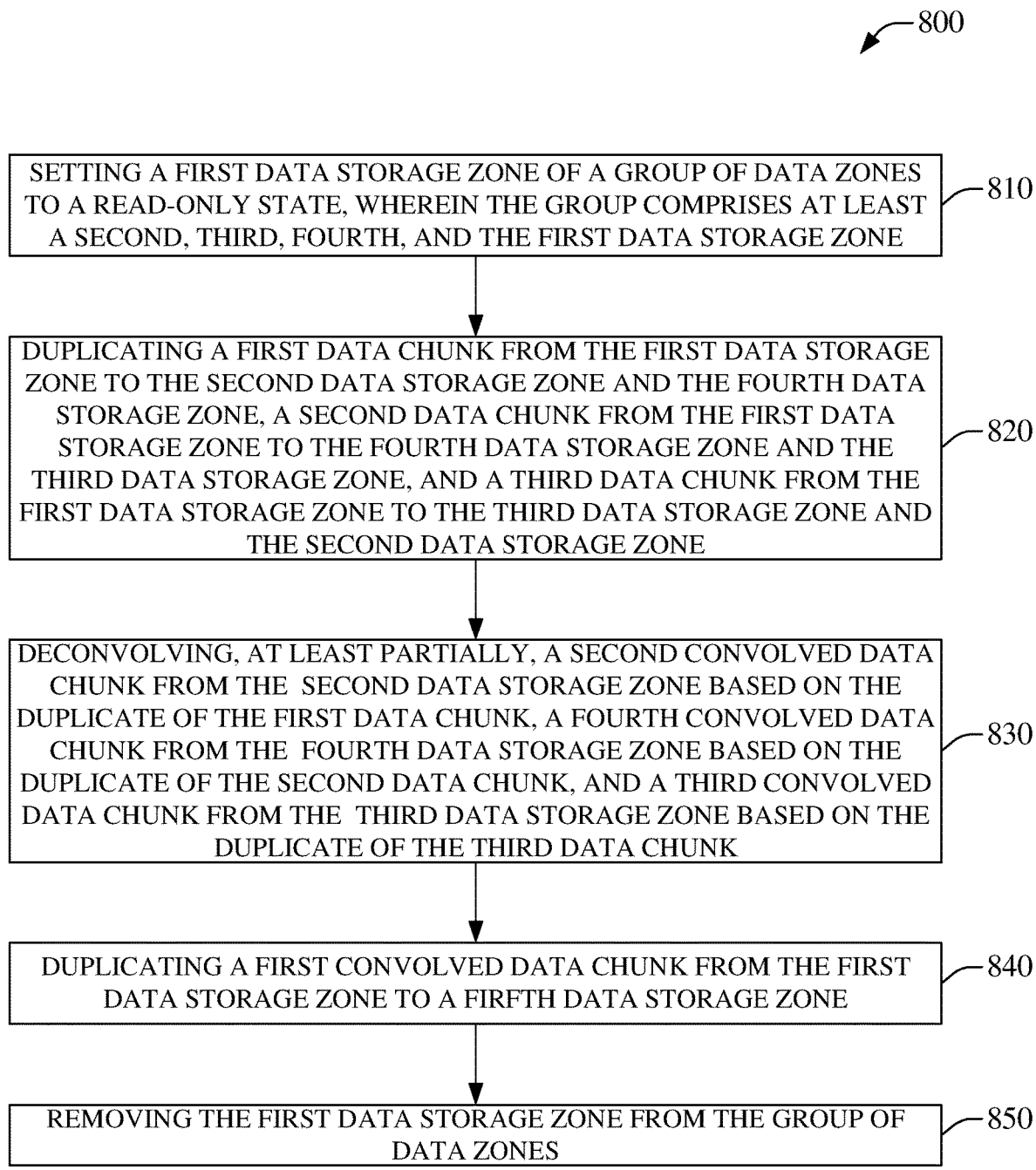
FIG. 8 illustrates an example method that enables scaling-in of geographically diverse storage of data employing an additional data storage zone, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate scaling-in for geographically diverse storage of data via a first morphology, in accordance with aspects of the subject disclosure. At 610, method 600 can comprise setting a first data storage zone of a group of data zones comprised in a geographically diverse data storage system to a 'read-only' state. In some embodiments, the group can comprise a second, third, and fourth data storage zone of the geographically diverse data storage system. As disclosed herein, the data storage zones can comprise ZSCs that can store data chunks. In an aspect, a data chunk can comprise a representation of other data chunks convolved into a data chunk, e.g., a data chunk can be the same as, or similar to, data chunk 'B3D2C1' data chunk 118 which can comprise a convolved representation of chunks 'B3', 'D2', and 'C1', or similarly, convolved representations comprised in data chunks 128, 138, 148, etc. Where, at 610, there can be four ZSC corresponding to the four zones, the ZSCs can store data chunks that are duplicated in convolved representations stored on other ZSCs of the geographically diverse data storage system, for example, to provide data recovery. Scaling-in of the geographically diverse data storage system, for example, by removing the first data storage zone, etc., can be performed in a manner that continues protection of the data from the first zone as is presently disclosed herein.

At 620, method 600 can comprise duplicating a first data chunk from the first data storage zone, e.g., from a ZSC of the first zone, such as ZSC 110, etc., to the second data storage zone, e.g., at a second ZSC, and to the fourth data storage zone, e.g., at a fourth ZSC. Moreover, a second data chunk from the first zone can be duplicated to the fourth zone and to the third zone. Further a third data chunk from the first zone can be duplicated to the third zone and to the second zone. In an aspect, this can preserve the duplicated data chunks from the first zone, as a primary duplicate and a back-up/secondary duplicate, at ZSCs of the zones expected to remain active in the geographically diverse data storage system after the ZSC of the first zone is removed during the scaling-in event.

At 630, method 600 can comprise deconvolving a second convolved data chunk of the second zone based on the duplicate of the first data chunk duplicated at the second zone. A fourth convolved data chunk at the fourth zone can be, at 630, deconvolved based on the duplicate of the second data chunk stored at the fourth zone. Moreover, a third convolved data chunk of the third zone can be deconvolved, at 630, based on the duplicate of the third data chunks stored at the third zone. In an aspect, the deconvolution of the several convolved data chunks can be a complete deconvolution, a partial deconvolution, etc., for example, a convolved chunk 'B3D2C1' can be fully deconvolved into 'B3', 'D2', and 'C1' chunks, can be partially deconvolved into 'B3' and 'D2C1' chunks, can be partially deconvolved into 'D2' and 'B3C1' chunks, can be partially deconvolved into 'C1' and 'B3D2' chunks, etc.

At 640, method 600 can comprise duplicating a first convolved data chunk of the first zone at a second zone. The duplicate of the first convolved data chunk can be deconvolved, at least partially, based on a corresponding data chunk of the second zone. As an example, where an example chunk, such as 'B3D2C1', is duplicated to a second zone comprising 'B3', the duplicate can be deconvolved to yield convolved chunk 'D2C1' and chunk 'B3', where the duplicative 'B3' chunk can then be deleted to reduce storage space consumption. As a second example, where the example chunk 'B3D2C1' is duplicated to the second zone comprising 'D2', the duplicate can be deconvolved to yield convolved chunk 'B3C1' and chunk 'D2', where the duplicative 'D2' chunk can then be deleted to reduce storage space consumption.

In an aspect, at 640, deconvolving of the duplicate based on the corresponding chunk at the second zone can result in the corresponding chunk lacking geographic diversity, e.g., where the duplicate of 'B3D2C1', is deconvolved to yield convolved chunk 'D2C1' based on chunk 'B3' at the second zone, 'B3' can lack a duplicate of the 'B3' chunk at another geographically diverse zone. Accordingly, to preserve the geographic diversity of 'backup' chunks, the corresponding chunk can be duplicated from the second zone to another zone of the geographically diverse storage system, e.g., to a third ZSC. Duplicating the corresponding chunk to another ZSC can provide geographic diversity, e.g., 'B3' can exist in the second zone and a duplicate of 'B3' (that was previously diverse via inclusion in convolved chunk 'B3D2C1' at the first zone) can be stored at the third zone.

Method 600, through 640, duplicates chunks and/or processes chunks to provide redundancy for data chunks of the first zone in other zones of the geographically diverse storage system. In an aspect, method 600, through 640, also works to avoid inflating data storage space consumption by removing unneeded duplicates of data chunks. As such, at 650, method 600 can comprise removing the first data storage zone, from the group of data zones, for example, the first ZSC can be excluded from the geographically diverse data storage system, e.g., the example initial four zones of the group, as presented at 610, can be reduced/scaled-in to three remaining zones at 650.

FIG. 7 is an illustration of an example method 700, which can facilitate scaling-in for geographically diverse storage of data via a second morphology, in accordance with aspects of the subject disclosure. At 710, method 700 can comprise setting a first data storage zone of a group of data zones comprised in a geographically diverse data storage system to a 'read-only' state. An embodiment of the group can comprise a second, third, and fourth data storage zone of the geographically diverse data storage system. As disclosed herein, the data storage zones can comprise ZSCs that can store data chunks and a data chunk can, in an embodiment, comprise a representation of other data chunks convolved into a data chunk, e.g., a data chunk can be the same as, or similar to, data chunk 'B3D2C1' data chunk 118 which can comprise a convolved representation of chunks 'B3', 'D2', and 'C1', or similarly, convolved representations comprised in data chunks 128, 138, 148, etc. Where, at 710, there can be four ZSC corresponding to the four zones, the ZSCs can store data chunks that are duplicated in convolved representations stored on other ZSCs of the geographically diverse data storage system, for example, to provide data recovery. Scaling-in of the geographically diverse data storage system, for example, by removing the first data storage zone, etc., can be performed in a manner that maintains protection of the data from the first zone.

At 720, method 700 can comprise duplicating a first data chunk from the first data storage zone, e.g., from a ZSC of the first zone, such as ZSC 110, etc., to the second data storage zone, e.g., at a second ZSC, and to the fourth data storage zone, e.g., at a fourth ZSC. Moreover, a second data chunk from the first zone can be duplicated to the fourth zone and to the third zone. Further a third data chunk from the first zone can be duplicated to the third zone and to the second zone. In an aspect, this can preserve the duplicated data chunks from the first zone, as a primary duplicate and a back-up/secondary duplicate, at ZSCs of the zones expected to remain active in the geographically diverse data storage system after the ZSC of the first zone is removed during the scaling-in event.

At 730, method 700 can comprise deconvolving a second convolved data chunk of the second zone based on the duplicate of the first data chunk duplicated at the second zone. A fourth convolved data chunk at the fourth zone can be, at 730, deconvolved based on the duplicate of the second data chunk stored at the fourth zone. Moreover, a third convolved data chunk of the third zone can be deconvolved, at 730, based on the duplicate of the third data chunks stored at the third zone. In an aspect, the deconvolution of the several convolved data chunks can be a complete deconvolution, a partial deconvolution, etc., for example, a convolved chunk 'B3D2C1' can be fully deconvolved into 'B3', 'D2', and 'C1' chunks, can be partially deconvolved into 'B3' and 'D2C1' chunks, can be partially deconvolved into 'D2' and 'B3C1' chunks, can be partially deconvolved into 'C1' and 'B3D2' chunks, etc.

At 740, method 700 can comprise duplicating a first convolved data chunk of the first zone at a third zone. The duplicate of the first convolved data chunk can be deconvolved, at least partially, based on a corresponding data chunk of the third zone. As an example, where an example chunk, such as 'B3D2C1', is duplicated to a third zone comprising 'C1', the duplicate can be deconvolved to yield convolved chunk 'B3D2' and chunk 'C1'.

In an aspect, at 740, deconvolving of the duplicate based on the corresponding chunk at the third zone can result in the corresponding chunk lacking geographic diversity, e.g., where the duplicate of 'B3D2C1', is deconvolved to yield convolved chunk 'B3D2' based on chunk 'C1' at the third zone, 'C1' can lack a duplicate of the 'C1' chunk at another geographically diverse zone. Accordingly, to preserve the geographic diversity of 'backup' chunks, the corresponding chunk can be duplicated from the third zone to another zone of the geographically diverse storage system, e.g., to a second ZSC, fourth ZSC, etc. Duplicating the corresponding chunk to another ZSC can provide geographic diversity, e.g., 'C1' can exist in the third zone and a duplicate of 'C1' (that was previously diverse via inclusion in convolved chunk 'B3D2C1' at the first zone) can be stored at the second zone, fourth zone, etc.

Method 700, through 740, duplicates chunks and/or processes chunks to provide redundancy for data chunks of the first zone in other zones of the geographically diverse storage system. In an aspect, method 700, through 740, also works to avoid inflating data storage space consumption by removing unneeded duplicates of data chunks. As such, at 750, method 700 can comprise removing the first data storage zone, from the group of data zones, for example, the first ZSC can be excluded from the geographically diverse data storage system, e.g., the example initial four zones of the group, as presented at 710, can be reduced/scaled-in to three remaining zones at 750.

FIG. 8 is an illustration of an example method 800, which can enable scaling-in of geographically diverse storage of data employing an additional data storage zone, in accordance with aspects of the subject disclosure. At 810, method 800 can comprise setting a first data storage zone of a group of data zones comprised in a geographically diverse data storage system to a 'read-only' state. An embodiment of the group can comprise a second, third, and fourth data storage zone of the geographically diverse data storage system. As disclosed herein, the data storage zones can comprise ZSCs that can store data chunks and a data chunk can, in an embodiment, comprise a representation of other data chunks convolved into a data chunk, e.g., a data chunk can be the same as, or similar to, data chunk 'B3D2C1' data chunk 118 which can comprise a convolved representation of chunks 'B3', 'D2', and 'C1', or similarly, convolved representations comprised in data chunks 128, 138, 148, etc. Where, at 810, there can be four ZSC corresponding to the four zones, the ZSCs can store data chunks that are duplicated in convolved representations stored on other ZSCs of the geographically diverse data storage system, for example, to provide data recovery. Scaling-in of the geographically diverse data storage system, for example, by removing the first data storage zone, etc., can be performed in a manner that maintains protection of the data from the first zone.

At 820, method 800 can comprise duplicating a first data chunk from the first data storage zone, e.g., from a ZSC of the first zone, such as ZSC 110, etc., to the second data storage zone, e.g., at a second ZSC, and to the fourth data storage zone, e.g., at a fourth ZSC. Moreover, a second data chunk from the first zone can be duplicated to the fourth zone and to the third zone. Further a third data chunk from the first zone can be duplicated to the third zone and to the second zone. In an aspect, this can preserve the duplicated data chunks from the first zone, as a primary duplicate and a back-up/secondary duplicate, at ZSCs of the zones expected to remain active in the geographically diverse data storage system after the ZSC of the first zone is removed during the scaling-in event.

At 830, method 800 can comprise deconvolving a second convolved data chunk of the second zone based on the duplicate of the first data chunk duplicated at the second zone. A fourth convolved data chunk at the fourth zone can be, at 830, deconvolved based on the duplicate of the second data chunk stored at the fourth zone. Moreover, a third convolved data chunk of the third zone can be deconvolved, at 830, based on the duplicate of the third data chunks stored at the third zone. In an aspect, the deconvolution of the several convolved data chunks can be a complete deconvolution, a partial deconvolution, etc., for example, a convolved chunk 'B3D2C1' can be fully deconvolved into 'B3', 'D2', and 'C1' chunks, can be partially deconvolved into 'B3' and 'D2C1' chunks, can be partially deconvolved into 'D2' and 'B3C1' chunks, can be partially deconvolved into 'C1' and 'B3D2' chunks, etc.

At 840, method 800 can comprise duplicating a first convolved data chunk of the first zone at a fifth zone. The duplicate of the first convolved data chunk can be duplicated to the fifth zone to preserve the geographical diversity of the duplicate data chunks convolved in the first convolved data chunk, e.g., an example chunk, such as 'B3D2C1', can be duplicated to the fifth zone to enable deconvolving the example chunk to access any of 'B3', 'D2', and/or 'C1'.

Method 800, through 840, duplicates chunks and/or processes chunks to provide redundancy for data chunks of the first zone in other zones of the geographically diverse storage system. In an aspect, method 800, through 840, can also work to avoid inflating data storage space consumption by removing unneeded duplicates of data chunks. As such, at 850, method 800 can comprise removing the first data storage zone, from the group of data zones, for example, the first ZSC can be excluded from the geographically diverse data storage system, e.g., the example initial four zones of the group, as presented at 810, can be reduced/scaled-in to four remaining zones at 850, e.g., the first to fourth zones can be scaled-in, resulting in the second to fifth zones. In method 800, scaling-in can result in z same, or even larger, count of zones, as a result of removing, for example, the first zone. As such, it is noted that the scaling-in technology disclosed herein generally relates to efficaciously removing a zone from the geographically diverse data storage system, rather than necessarily having a lower count of zones/ZSCs as a result of the scaling-in event, though generally, as is illustrated elsewhere herein, a lower count of zones/ZSCs can be a typical result of a scaling-in event.

Figure 9:
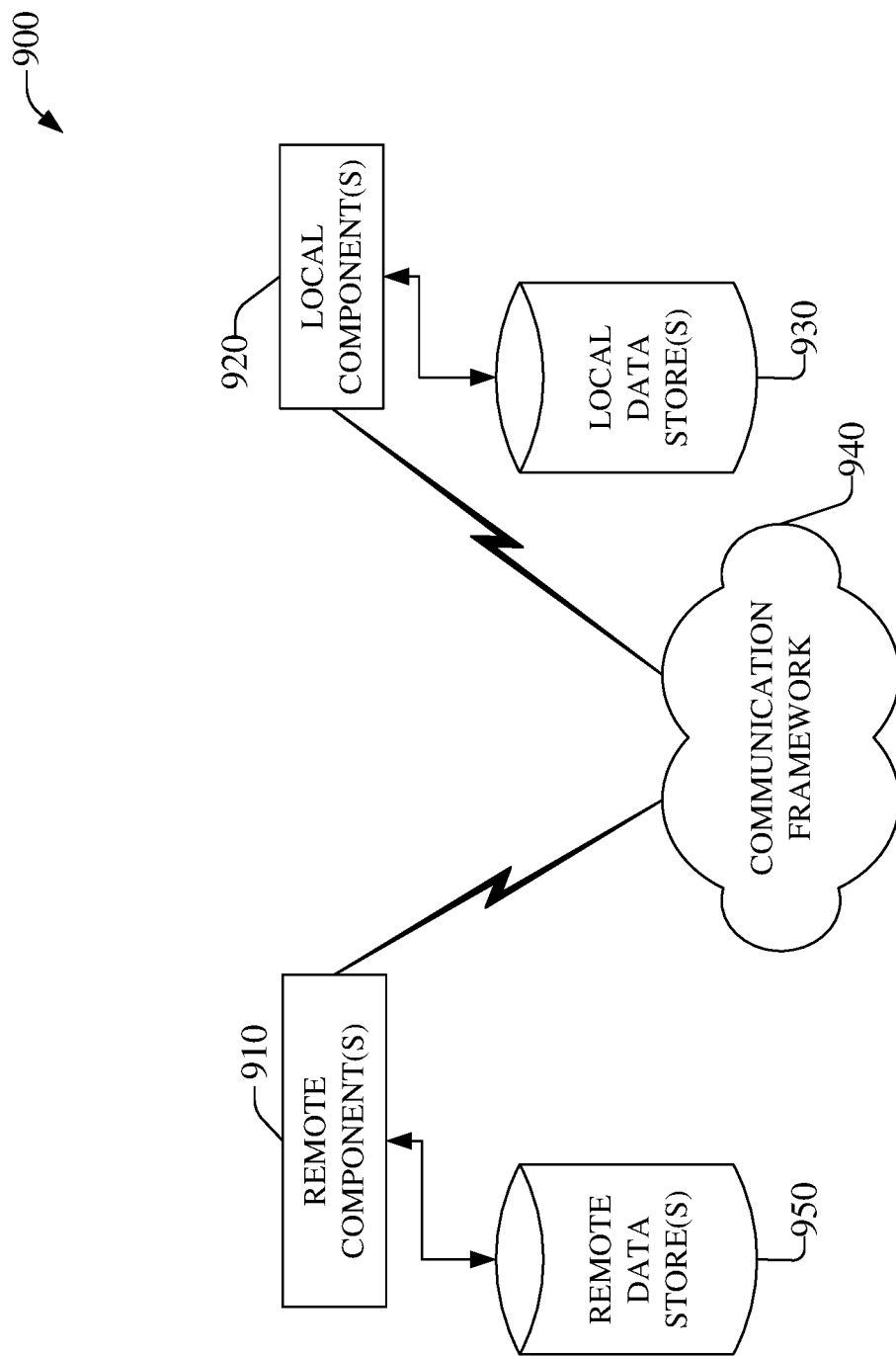
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located ZSC connected to a local ZSC via communication framework 940, that can be the same as, or similar to, communication framework 102, and can comprise radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local ZSC connected to a remote ZSC via a communication framework 940. In an aspect the remotely located ZSC or local ZSC can be embodied in ZSC 110-140, ZSC 210-240, ZSC 310-340, ZSC 410-440, ZSC 510-550, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, information corresponding to chunks stored on ZSCs can be communicated via communication framework 940 to other ZSCs of a storage network, e.g., to facilitate compression and storage in partial or complete chunks on a ZSC as disclosed herein.

Figure 10:
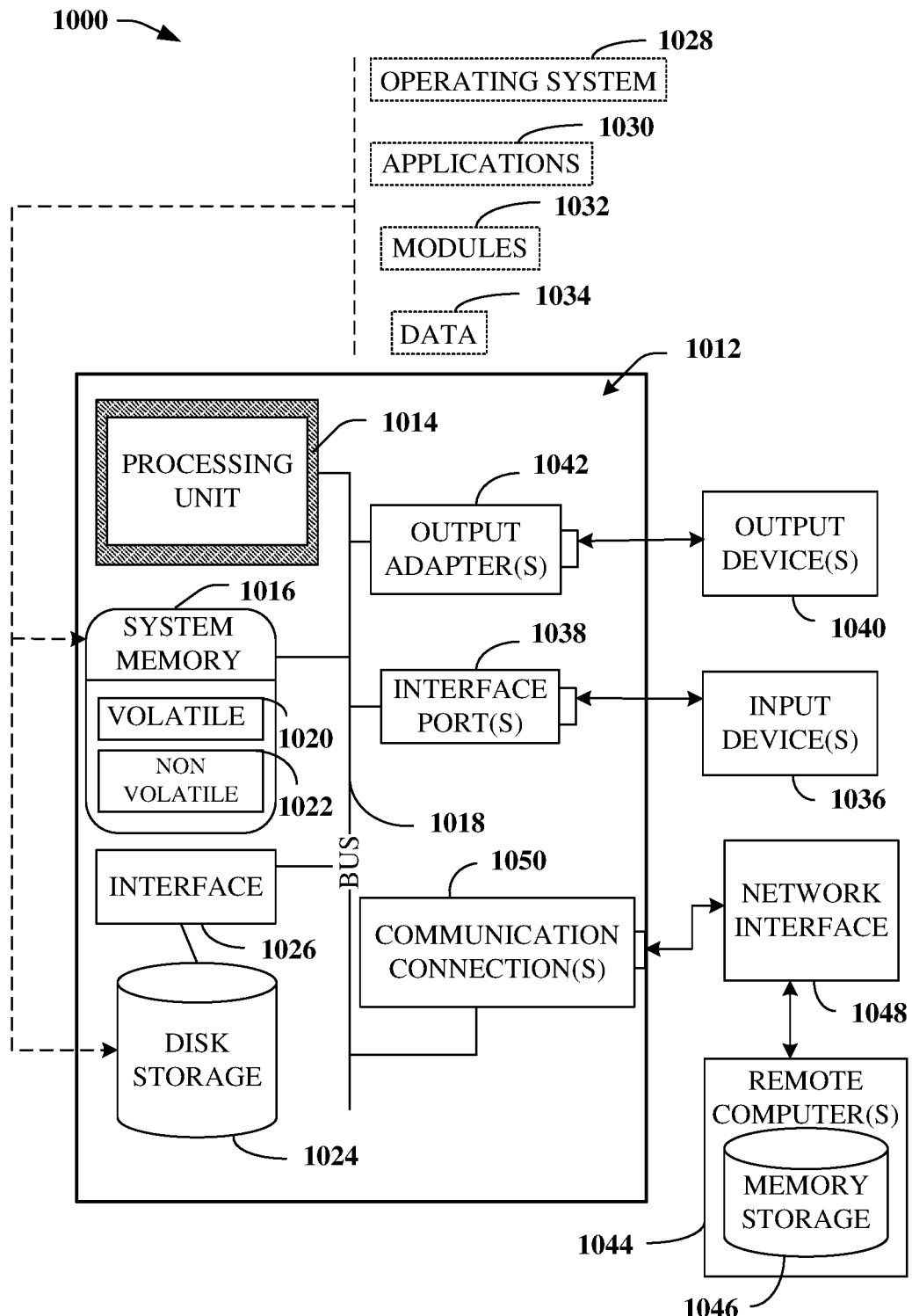
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a ZSC, e.g., 110-140, 210-240, 310-340, 410-440, 510-550, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising storing a compressed group of chunks at a ZSC, e.g., 110-140, 210-240, 310-340, 410-440, 510-550, etc., as disclosed herein. This can provide improvements to the geographically diverse data storage system itself, e.g., more efficient use of storage space, scaling-in of the system with fewer operations than conventional technologies, etc.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Disclosed systems, apparatuses, components, embodiments, etc., or subsets thereof, should neither be presumed to be exclusive of other disclosed systems, apparatuses, components, embodiments, etc., nor should a system, apparatus, component, embodiment, etc., be presumed to be exclusive to its depicted representation in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of components (or embodiments) into a single component achieving aggregate functionality, where suitable, or distribution of functionality of a single system or component into multiple systems or components, where suitable. In addition, incorporation, combination or modification of systems or components depicted herein or modified as stated above with systems, apparatuses, components or subsets thereof not explicitly depicted herein but known in the art or made evident to one with ordinary skill in the art through the context disclosed herein are also considered within the scope of the present disclosure.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
 a processor; and
 a memory that stores executable instructions that, when executed by the processor, facilitate performance of operations, comprising:
  determining a number of data zones comprising a distributed storage construct, wherein the data zones comprise a first data zone comprising a first data chunk, a second data zone comprising a second data chunk, and a third data zone, and wherein the first data zone, the second data zone, and the third data zone are different data zones;
  determining that the first data zone is to be removed from the distributed storage construct, wherein the first data chunk is represented in a first combined data chunk that is stored on the second data zone, wherein the first combined data chunk is a combination of the first data chunk and first other data chunks, wherein the first other data chunks comprise first data chunks from each of the data zones other than the first data zone and other than the second data zone;

in response to the determining that the first data zone is to be removed from the distributed storage construct and prior to removing the first data zone from the distributed storage construct, replicating a second combined data chunk stored at the first data zone into the second data zone, wherein the second combined data chunk is a combination of the second data chunk and second other data chunks, and wherein the second other data chunks comprise second data chunks from each of the data zones other than the first data zone;

replicating the first data chunk to the second data zone resulting in a primary first data chunk copy;

replicating the first data chunk to the third data zone resulting in a secondary first data chunk copy;

in response to extracting the first data chunk from the first combined data chunk, resulting in a modified first combined data chunk stored at the second data zone, removing the first data zone from the distributed storage construct;

extracting from the second combined data chunk the second data chunk stored on the second data zone, resulting in a modified second combined data chunk; and replicating the second data chunk into another data zone of the data zones other than the first data zone and other than the second data zone, resulting in a secondary second data chunk copy on the other data zone.

2. The system of claim 1, wherein the operations are performed in response to receiving an indication that the first data zone is to be removed from the distributed storage construct.

3. The system of claim 2, wherein the indication is a result of the first data zone being designated as read-only storage.

4. The system of claim 1, wherein, the first combined data chunk results from an XOR combination of the first data chunk and the first other data chunks.

5. The system of claim 1, wherein, the second combined data chunk results from an XOR combination of the second data chunk and the second other data chunks.

6. The system of claim 1, wherein:

the number of data zones is four;

an initial state of the distributed storage construct prior to performing the operations is:

the first data zone comprises data chunk A1, data chunk A2, data chunk A3, and the second combined data chunk, wherein the first data chunk is the data chunk A1, and wherein the second combined data chunk is a first XOR combination of data chunk B3, data chunk D2, and data chunk C1;

the second data zone comprises data chunk B1, data chunk B2, the data chunk B3, and the first combined data chunk, wherein the second data chunk is the data chunk B3, and wherein the first combined data chunk is a second XOR combination of the data chunk A1, data chunk C2, and data chunk D3;

the third data zone comprises the data chunk C1, the data chunk C2, data chunk C3, and a third combined data chunk that is a third XOR combination of the data chunk A3, the data chunk B2, and data chunk D1; and a fourth data zone comprises the data chunk D1, the data chunk D2, the data chunk D3, and a fourth combined data chunk that is a fourth XOR combination of the data chunk A2, the data chunk B1, and the data chunk C3; and a resulting state of the distributed storage construct after performing the operations is:

the second data zone comprises the data chunk B1, the data chunk B2, the data chunk B3, a primary copy of the data chunk A1, a secondary copy of the data chunk A3, the modified first combined data chunk that is a fifth XOR combination of the data chunk C2, and the data chunk D3, and the modified second combined data chunk that is a sixth XOR combination of the data chunk D2 and the data chunk C1;

the third data zone comprises the data chunk C1, the data chunk C2, the data chunk C3, a primary copy of the data chunk A3, a secondary copy of the data chunk A2, a secondary copy of the data chunk B3, and a modified third combined data chunk that is a seventh XOR combination of the data chunk B2 and the data chunk Dl; and the fourth data zone comprises the data chunk D1, the data chunk D2, the data chunk D3, a primary copy of the data chunk A2, a secondary copy of the data chunk A1, and a modified fourth combined data chunk that is an eighth XOR combination of the data chunk B1 and the data chunk C3.

7. The system of claim 6, wherein the resulting state of the distributed storage construct, with regard to the second data zone, results from operations comprising:

replicating the data chunk A1 to the second data zone resulting in the primary copy of the data chunk A1;

replicating the data chunk A3 to the second data zone resulting in the secondary copy of the data chunk A3;

extracting the data chunk A1 from the first combined data chunk, resulting in the modified first combined data chunk stored at the second data zone;

extracting the data chunk B3 from the second combined data chunk in response to replicating the second combined data chunk stored at the first data zone into the second data zone; and facilitating replication of the data chunk B3 into the third data zone, resulting in the secondary copy of data chunk B3 at the third zone.

8. The system of claim 6, wherein the resulting state of the distributed storage construct, with regard to the third data zone, results from operations comprising:

replicating the data chunk A3 to the third data zone resulting in the primary copy of the data chunk A3;

replicating the data chunk A2 to the third data zone resulting in the secondary copy of the data chunk A2;

replicating the data chunk B3 from the second data zone into the third data zone resulting in the secondary copy of the data chunk B3; and extracting the data chunk A3 from the third combined data chunk, resulting in the modified third combined data chunk stored at the third data zone.

9. The system of claim 6, wherein the resulting state of the distributed storage construct, with regard to the fourth data zone, results from operations comprising:

replicating the data chunk A2 to the fourth data zone resulting in the primary copy of the data chunk A2;

replicating the data chunk A1 to the fourth data zone resulting in the secondary copy of the data chunk A1; and extracting the data chunk A2 from the fourth combined data chunk, resulting in the modified fourth combined data chunk stored at the fourth data zone.

10. The system of claim 6, wherein the resulting state of the distributed storage construct, with regard to the first data zone, results from operations comprising:

replicating the data chunk A1 to the second data zone resulting in the primary copy of the data chunk A1 at the second zone;
replicating the data chunk A3 to the second data zone resulting in the secondary copy of the data chunk A3 at the second zone;
replicating the data chunk A3 to the third data zone resulting in the primary copy of the data chunk A3 at the third zone;
replicating the data chunk A2 to the third data zone resulting in the secondary copy of the data chunk A2 at the third zone;
replicating data chunk A2 to the fourth data zone resulting in the primary copy of the data chunk A2 at the fourth zone;
replicating data chunk A1 to the fourth data zone resulting in the secondary copy of the data chunk A1 at the fourth zone;
replicating the second combined data chunk stored at the first data zone into the second data zone; and
in response to receiving an indication of successful completion of other operations in the second data zone, the third data zone, and the fourth data zone, removing the first data zone from the distributed storage construct.

11. A method, comprising:
determining, by a system comprising a processor, that a first data zone is to be removed from a distributed storage construct wherein the distributed storage construct comprises a first data zone comprising a first data chunk, a second data zone comprising a second data chunk, and a third data zone, wherein the first data zone, the second data zone, and the third data zone are different data zones, wherein the first data chunk is represented in a first combined data chunk that is stored in the second data zone, wherein the first combined data chunk is a combination of the first data chunk and first other data chunks, and wherein the first other data chunks comprise first data chunks from each of the data zones other than the first data zone and other than the second data zone;
in response to the determining, by the system, that the first data zone is to be removed from the distributed storage construct and prior to removing the first data zone from the distributed storage construct, replicating a second combined data chunk stored at the first data zone into the second data zone, wherein the second combined data chunk is a combination of the second data chunk and second other data chunks, and wherein the second other data chunks comprise second data chunks from each of the data zones other than the first data zone;
replicating, by the system, the first data chunk to the second data zone, resulting in a primary first data chunk copy, and the first data chunk to the third data zone, resulting in a secondary first data chunk copy;
in response to extracting, by the system, the first data chunk from the first combined data chunk, resulting in a modified first combined data chunk stored at the second data zone, removing the first data zone from the distributed storage construct;
extracting, by the system, from the second combined data chunk the second data chunk stored on the second data zone, resulting in a modified second combined data chunk; and
replicating, by the system, the second data chunk into another data zone of the data zones other than the first data zone and other than the second data zone, resulting in a secondary second data chunk copy on the other data zone.

12. The method of claim 11, wherein the determining that the fist data zone is to be removed is in response to a planned removal of the first data zone.

13. The method of claim 11, wherein the determining that the fist data zone is to be removed is in response to an unplanned removal of the first data zone.

14. The method of claim 11, wherein the determining that the fist data zone is to be removed is based on the first zone being placed in a 'read-only' state.

15. The method of claim 11, wherein, the first combined data chunk results from an XOR combination of the first data chunk and the first other data chunks.

16. A machine-readable storage medium, comprising executable instructions that, when executed by a processor, facilitate performance of operations, comprising:
receiving an indication that a first data zone is to be removed from a distributed storage construct wherein the distributed storage construct comprises a first data zone comprising a first data chunk, a second data zone comprising a second data chunk, and a third data zone, wherein the first data zone, the second data zone, and the third data zone are different data zones, wherein the first data chunk is represented in a first combined data chunk that is stored in the second data zone, wherein the first combined data chunk is a combination of the first data chunk and first other data chunks, and wherein the first other data chunks comprise first data chunks from each of the data zones other than the first data zone and other than the second data zone;
duplicating the first data chunk to the second data zone, resulting in a primary first data chunk copy;
duplicating the first data chunk to the third data zone, resulting in a secondary first data chunk copy;
duplicating a second combined data chunk stored at the first data zone into the second data zone, wherein the second combined data chunk is a combination of the second data chunk and second other data chunks, and wherein the second other data chunks comprise second data chunks from each of the data zones other than the first data zone;
in response to at least a partial deconvolution of the second data chunk from the second combined data chunk, removing the second data chunk stored on the second data zone from the second combined data chunk, storing a modified second combined data chunk at the second data zone, and duplicating the second data chunk into another data zone of the data zones other than the first data zone and other than the second data zone, resulting in a secondary second data chunk copy on the other data zone; and
in response to at least a partial deconvolution of the first data chunk from the first combined data chunk that results in a modified first combined data chunk stored at the second data zone, removing the first data zone from the distributed storage construct.

17. The machine-readable storage medium of claim 16, wherein the determining that the fist data zone is to be removed is in response to a planned removal of the first data zone.

18. The machine-readable storage medium of claim 16, wherein, the first combined data chunk results from an XOR combination of the first data chunk and the first other data chunks.

19. The machine-readable storage medium of claim 16, wherein the determining that the fist data zone is to be removed is in response to an unplanned removal of the first data zone.

20. The machine-readable storage medium of claim 16, wherein the determining that the fist data zone is to be removed is in response to the first zone being placed in a 'read-only' state.

* * * * *